United States Patent [19]
Fujii et al.

[11] Patent Number: 4,571,986
[45] Date of Patent: Feb. 25, 1986

[54] PIPE LEAK DETECTOR

[75] Inventors: Noritsugu Fujii; Toshimitsu Nishimura, both of Yamaguchi, Japan

[73] Assignee: Kabushiki Kaisha Kobe Seiko Sho, Kobe, Japan

[21] Appl. No.: 540,619

[22] Filed: Oct. 11, 1983

[30] Foreign Application Priority Data

Oct. 12, 1982 [JP] Japan .................. 57-154819[U]
Oct. 12, 1982 [JP] Japan .................. 57-154820[U]
Mar. 16, 1983 [JP] Japan .................... 58-42437

[51] Int. Cl.⁴ .......................................... G01M 3/08
[52] U.S. Cl. ...................................... 73/49.1; 73/49.3; 73/49.8; 138/90
[58] Field of Search ................. 73/49.1, 40, 45.5, 46, 73/40.5 R, 49.8, 49.3; 138/89, 90

[56] References Cited

U.S. PATENT DOCUMENTS

| Re. 26,657 | 9/1969 | Fitzpatrick et al. | 73/40 |
| 2,232,199 | 2/1941 | Bald | 138/90 |
| 2,507,124 | 5/1950 | Stillinger | 73/49.6 |
| 3,100,986 | 8/1963 | Starr et al. | 73/40 |
| 3,316,753 | 5/1967 | Le Roy Herren | 73/49.1 |
| 3,434,337 | 3/1969 | Goeke | 73/49.8 |
| 3,499,469 | 3/1970 | Vizuete et al. | 73/49.1 |
| 3,792,607 | 2/1974 | Fukuda | 73/49.3 |
| 4,344,320 | 8/1982 | Haupt et al. | 73/49.1 |
| 4,393,674 | 7/1983 | Rasmussen | 73/49.1 |

FOREIGN PATENT DOCUMENTS

| 2238392 | 2/1978 | Fed. Rep. of Germany | 73/40 |
| 103341 | 8/1981 | Japan | 73/40 |
| 356322 | 9/1931 | United Kingdom | 73/40 |
| 734112 | 7/1955 | United Kingdom | 138/90 |
| 501243 | 4/1976 | U.S.S.R. | 73/46 |
| 794412 | 2/1981 | U.S.S.R. | 73/49.1 |

Primary Examiner—Stewart J. Levy
Assistant Examiner—Hezron E. Williams
Attorney, Agent, or Firm—Oblon, Fisher Spivak, McClelland & Maier

[57] ABSTRACT

A pneumatic pipe leak tester which includes: a compressed air source; a conduit of a first circuit connectible through an on-off valve to a pipe to be examined and provided with an electromagnetic valve; a conduit of a second circuit connectible through an on-off valve to a pipe to be examined and provided with an electromagnetic valve; a main conduit connecting the conduits of the first and second circuits to the compressed air source; a conduit of a third circuit communicating the conduits of the first and second circuits with each other; a calibration conduit branched off from one of the conduits of first and second circuits and connectible to a reference pipe through an on-off valve; an electromagnetic valve inserted in the conduit of the third circuit; a pressure transducer connected parallel with the electromagnetic valve of the third circuit C; and a detector adapted to produce a leak signal when the output signal of the pressure transducer exceeds a predetermined value; and a mechanism for sealing compressed air in the conduits of the respective circuits to the test pipes or in the conduit to the reference pipe by opening or closing the electromagnetic valves.

1 Claim, 10 Drawing Figures

PIPE LEAK DETECTOR

BACKGROUND OF THE INVENTION

1. Field of the Invention

This invention relates to a leak tester, and more particularly to a pneumatic leak tester particularly suitable for detecting leak defects in pipes.

2. Description of the Prior Art

The conventional leak detectors or testers which are arranged to check for leak defects by connecting pipes to the tester serially have a common problem in that it takes a long time for the inspection, particularly in a case where a great number of pipes have to be examined.

SUMMARY OF THE INVENTION

In view of the problem mentioned above, the present invention has as its object the provision of a pipe leak tester which can simultaneously check for leak defects in a plurality of pipes.

It is a primary object of the present invention to provide a pneumatic pipe leak tester which can simultaneously check for leak defects in a couple of pipes in a considerably facilitated manner.

It is another object of the present invention to provide a pipe leak tester of the nature mentioned above, which is equipped with a pipe clamp jig capable of clamping a pipe in a position for the leak test in a facilitated manner.

It is still another object of the present invention to provide a pipe leak tester of the nature mentioned above, which is equipped with an internal clamp jig capable of clamping a pipe in a position for leak testing by engagement with the inner periphery of the pipe no matter whether the pipe is in a free state or in an installed state.

According to a fundamental aspect of the present invention, there is provided a pipe leak tester comprising: a compressed air source; a conduit of a circuit A connectible through an on-off valve to a pipe to be examined and provided with an electromagnetic valve; a conduit of a circuit B connectible through an on-off valve to a pipe to be examined and provided with an electromagnetic valve; a main conduit connecting the conduits of circuits A and B to the compressed air source; a conduit of a circuit C communicating the conduits of circuits A and B with each other; a calibration conduit branched off from one of the conduits of circuits A and B and connectible to a reference pipe through an on-off valve; an electromagnetic valve inserted in the conduit of circuit C; a pressure transducer connected parallel with the electromagnetic valve of circuit C; and a detector adapted to produce a leak signal when the output signal of the pressure transducer exceeds a predetermined value; sealing compressed air in the conduits of the respective circuits to the test pies or in the conduit to the reference pipe by opening or closing the electromagnetic valves.

The above and other objects, features and advantages of the present invention will become apparent from the following description and the appended claims, taken in conjunction with the accompanying drawings which show by way of example some illustrative embodiments of the invention.

DETAILED DESCRIPTION OF THE PREFERRED EMBODIMENTS

Figure 1:
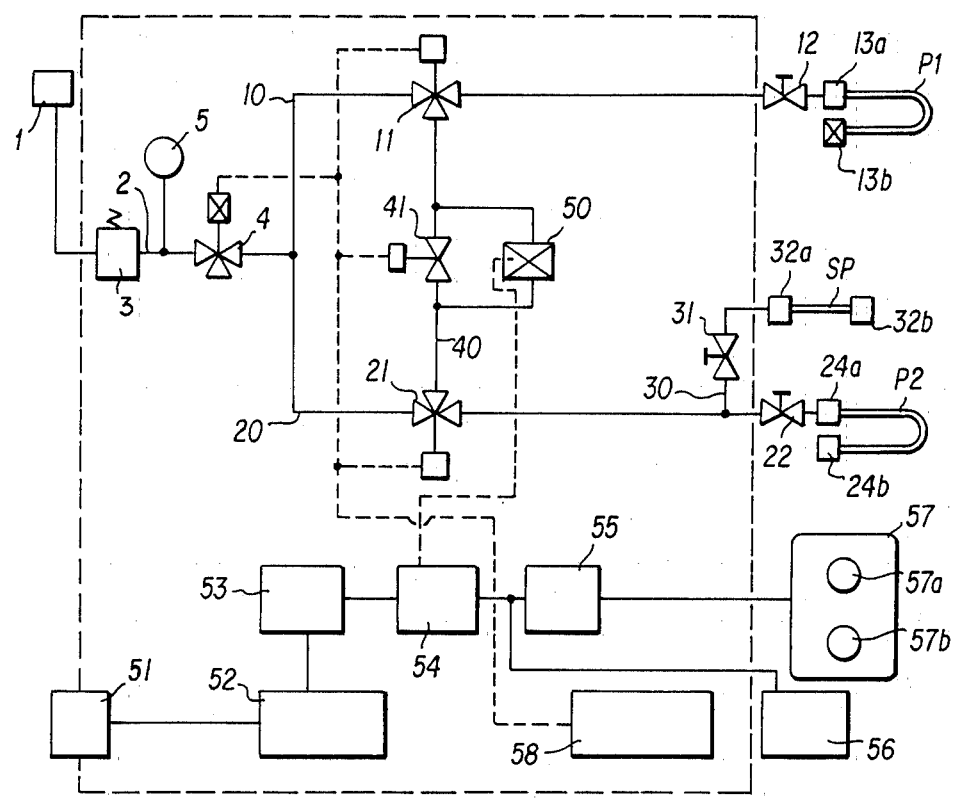
FIG. 1 is a pneumatic circuit diagram of a leak tester according to the present invention.

Referring to the accompanying drawings and first to FIG. 1, there is shown a pipe leak tester according to the present invention, which includes a compressed air source 1, and a main conduit 2 connected to a conduit 10 of circuit A and a conduit 20 of circuit B and communicated with the compressed air source 1 through a pressure reducing valve 3. Indicated at 4 is an electromagnetic feed/discharge valve which is inserted in the main conduit 2, and at 5 a pressure gauge. The conduit 10 of circuit A has an electromagnetic feed/discharge valve 11 inserted thereinto and is provided with a pipe chuck 13a at its end through an electromagnetic on-off valve 12 for hermetically holding a pipe P1 to be tested in cooperation with a pipe chuck 13b. The conduit 20 of circuit B has an electromagnetic feed/discharge valve 21 inserted thereinto and is provided with a pipe chuck 24a at an end portion through an electromagnetic on-off valve 22 for hermetically holding a pipe P2 in cooperation with a pipe chuck 24b. Designated at 30 is a calibrating conduit which is branched from the conduit 20 of circuit B and provided with an on-off valve 31 and a pipe chuck 2a for holding reference pipe Ps in cooperation with a pipe chuck 32b. The conduit 10 of circuit A and the conduit 20 of circuit B communicate with each other at electromagnetic valves 11 and 21, respectively, through conduit 40 of circuit C which has an on-off valve 41 inserted thereinto. A pressure transducer (hereinafter referred to simply as "transducer" for brevity is inserted parallel with the conduit 40 of circuit C. Designated at 51 is an AC power source, at 52 a constant voltage power supply, at 53 a rectifier and at 54 an amplifier. The amplifier 54 amplifies the output electric signal V (a positive or negative signal) of the transducer 50 and sends its output to a detector (a relay) 55 and a recorder 56. The relay 55 produces a leak signal (of level 1) when the value of its input signal is greater than a critical value (a constant of a positive or negative value) and a normal signal (of level 0) when the input value is within the range determined by the critical value. The leak or normal signal is fed to an indicator 57 with abnormal and normal indicator lamps 57b and 57, respectively, which are lit upon receipt of a leak signal and a normal signal, respectively. Indicated at 58 is a controller which sends out a valve-opening signal Io to the electromagnetic feed/discharge valves 4, 11 and 21 and the on-off valve 41 upon turning on an inspection start switch (not shown), the controller 58 producing a valve-closing signal Ic upon lapse of a predetermined time To after production of the valve-opening signal Io and then again a valve-opening signal Io upon lapse of a predetermined time T after production of the valve-closing signal Io. Further, upon lapse of a predetermind time Ts after production of the valve-closing signal Ic, the controller dispatches an inspection start signal Is to the transducer 50.

The above-described pipe leak detector of the invention operates in the following manner.

I. Calibration

The pipe chuck 32a is connected to one end of the reference pipe SP, sealing the other end with the pipe chuck 32b. After closing the on-off valves 12 and 22, the on-off valve 31 in the calibration conduit 30 is opened, and the inspection start switch is turned on to send out a valve-opening signal Io from the controller 58. At this point in time, the feed/discharge valves 4, 11, 21 and 41 are opened, so that the compressed air from the compressed air source 1 is fed to the reference pipe SP through the main conduit 2, the conduit 20 of circuit B and the conduit 30, and also to the conduits 10 and 40 of circuits A and C, respectively. As soon as the pressures in the conduits and pipes of the respective circuits and the reference pipe SP reach a predetermind level after lapse of the predetermined time To, the valve-closing signal Ic is fed to the feed/discharge valves 4, 11, 21 and 41 to close them. Accordingly, the feeding of compressed air from the compressed air source 1 is blocked, sealing in a predetermined air pressure. The calibrating operation is started as soon as compressed air is blocked.

Figure 2A:
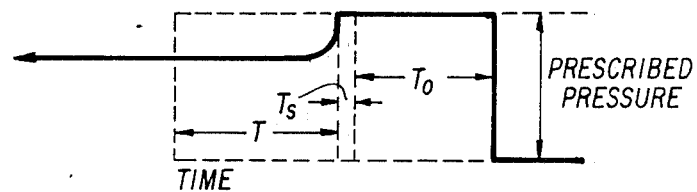
FIGS. 2a and 2b are diagrams of output waveforms.

FIG. 2a is a diagram showing pressure variations in the reference pipe PS. As is clear from a view thereof, even the pressure in the reference pipe which contains no hole drops to some extent after a certain stable time period Ts. This pressure reduction is attributable to the initial leaks in the respective feed/discharge and on-off valves, so that the critical value Eo is determined to allow the relay 55 to produce a leak signal when the output V exceeds the critical value Eo.

Therefore, if there are no abnormalities in the main conduit 2 and in the conduits 10, 20 and 40 of circuits A to C, the transducer produces an output of $-Eo > -V < +Eo$ and accordingly the relay 55 sends out a normal signal to light the normal indicator lamp 57a. Simultaneously, the recorder 56 reproduces the output wavweform of the transducer 50 (actually the output waveform of the amplifier 54). Upon lapse of time T after air sealing, the controller 58 sends out a valve-closing signal Ic, whereupon the feed/discharge valves 4, 11, 21 and 41 are closed to discharge the sealed air into the atmosphere. When the abnormal indicator lamp 57b is turned on, the above-described operation is repeated after checking the pipe end chuck feed/discharge valves and on-off valves for any abnormality and removing the source of trouble if any. When the normal indicator lamp 57a is turned on, the operation proceeds to the leak test as follows.

II. Leak Test

After opening the on-off valves 12 and 22, the pipe chucks 13a and 24a are fitted on respective ends of the testing pipes P1 and P2, sealing the opposite ends of the pipes by the pipe chucks 13b and 23b to connect them to the conduit 10 of circuit A and the conduit 20 of circuit B, respectively. The on-off valve 31 is closed. Then, the inspection start switch is turned on, whereupon the controller 58 produces a valve-opening signal Io to open the electromagnetic feed/discharge valves 4, 11, 21 and 41, The procedures after this stage are the same as in the above-described calibrating operation I. Namely, after lapse of the time period To, the respective electromagnetic valves are closed to seal compressed air of a predetermined pressure in the main conduit 2, the conduits 10, 20 and 40 of circuits A to C, and the testing pipes P1 and P2. Further, upon lapse of the time Ts, the output of the transducer 50 is fed to the relay 55.

Figure 2B:
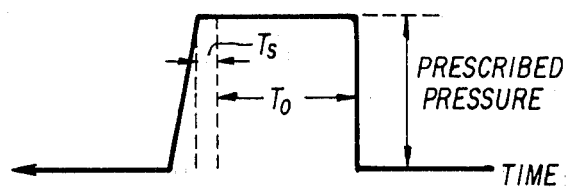
Figure 3:
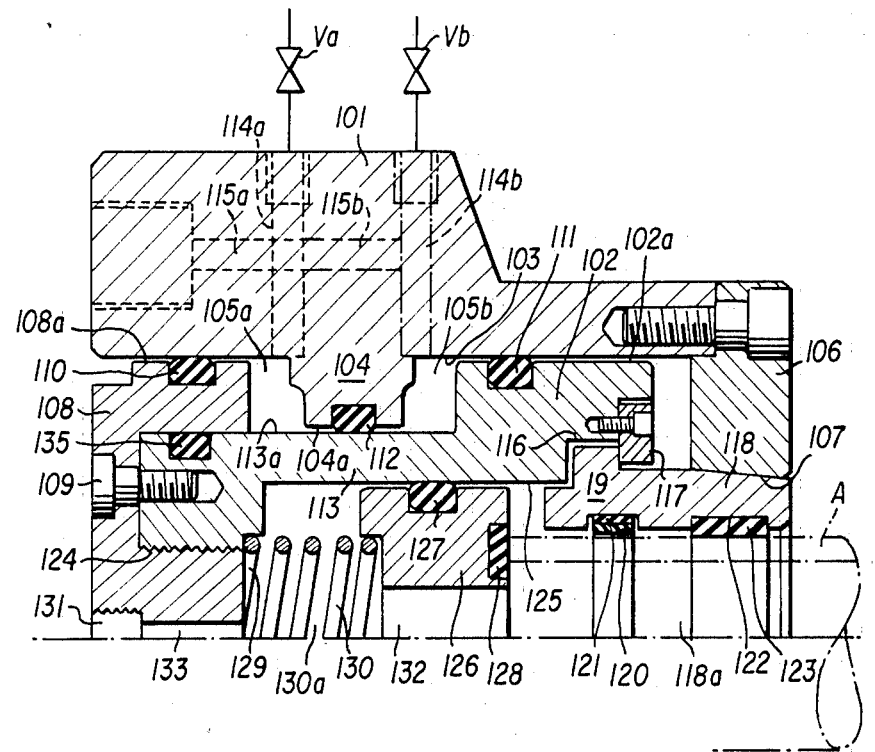
FIG. 3 is a vertically sectioned side of a clamp jig according to the invention, showing the jig in a clamping position.
Figure 4:
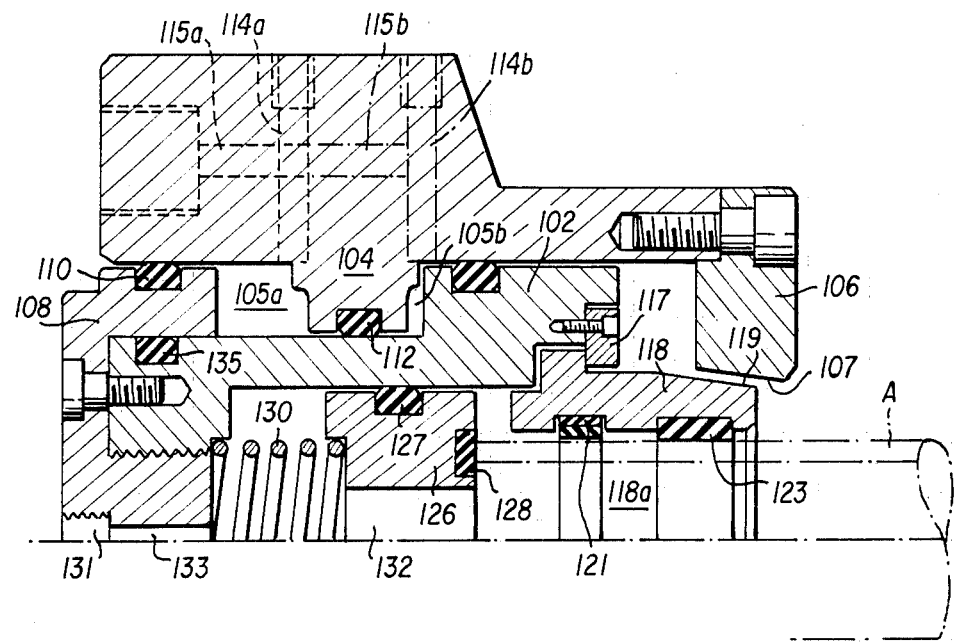
FIG. 4 is a view similar to FIG. 3 but showing the clamp jig in a released position.
Figure 5:
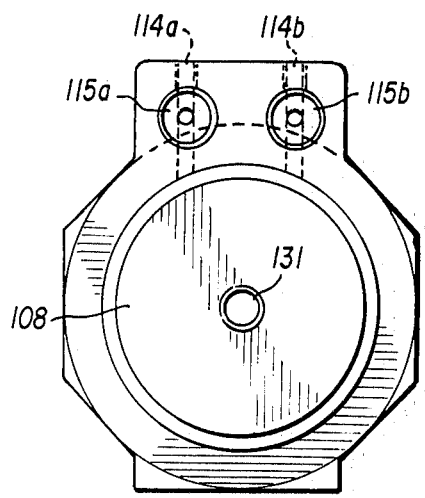
FIG. 5 is a view taken in the direction of arrow A in FIG. 3.

If there is no abnormality in the pipes P1 and P2 under examination, the relay 55 produces a normal signal to light the normal indicator lamp 57a. For example, if there is a hole in the pipe P1, the pressure differential between the two circuits becomes greater than the aforementioned value $\Delta P$ and accordingly the abnormal indicator lamp 57b is turned on. According to experimental data, if there is a hole of 10 microns in a pipe of 15.87 mm (diameter) $\times$ 1.10 mm (wall thickness) $\times$ 200.00 mm (length), the sealed pressure is instantly released therethrough as shown in FIG. 2b, and the relay 55 is actuated immediately upon lapse of the time Ts. In a case where both of the testing pipes contain a hole, the pressure differential becomes greater than $\Delta P$ and the abnormal indicator lamp 57b is turned on since the possibility of the holes in the respective pipes having the same sectional area is negligible.

Although the results of the test are given by way of an indicator lamp in the foregoing embodiment, it is also possible to actuate an alarm or other indication means in response to the abnormal signal.

Referring now to FIGS. 3 to 6, there is shown a clamp jig suitable for use in the leak tester according to the present invention for facilitating loading and unloading of the pipes to be tested. In these figures, indicated at 101 is a clamp body proper which is internally provided with a cylinder 103 and a piston 102 which is slidable in the cylinder 103. The interior of the cylinder 103 is divided into a left cylinder chamber 105a and a right cylinder chamber 105b by an intermediate small-diameter portion 104. The right cylinder chamber 105b is closed by a plug member 106 which is securely fixed at the right end of the clamp body 101 and centrally provided with an opening at its tapered portion 107 to form an element of a clamp mechanism which will be described hereinbelow. The piston 102 has a cap 108 secured to its left end by a bolt 109, the surface on the outer periphery of the cap 108 being held in sliding contact with the inner periphery of the left cylinder chamber 105a through an O-ring 110. The circumferential surface of a right large-diameter portion of the piston 102 is held in sliding contact with the inner periphery of the right cylinder chamber 105b through an O-ring 111, while the inner peripheral surface 104a of the small-diameter portion which forms an annular projection on the inner side of the cylinder 103 is held in sliding contact with the circumferential surface 113a between the large-diameter portion of the piston 102 and the cap 108 through an O-ring 112. Consequently, the left and right cylinder chambers 105a and 105b are completely partitioned off from each other by the small-diameter portion 104 and O-ring 112. The left and right cylinder chambers 105a and 105b are in communication with air drain ports 114a and 114b, respectively, which are bored into the clamp body 101 and connected respectively to air feed passages 115a and 115b.

Figure 6A:
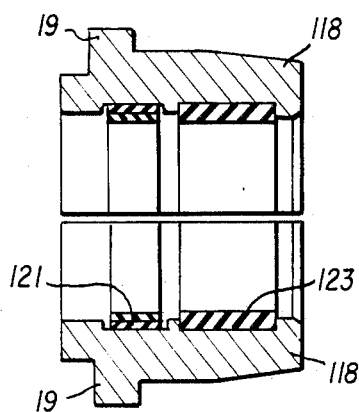
FIGS. 6a and 6b are a vertical sectional view and a front view, respectively of a clamp claw employed in the clamp jig of FIGS. 3 and 4.
Figure 6B:
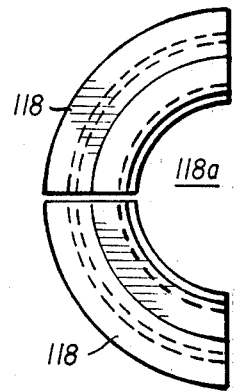

Formed on the inner surface at the right end of the above-mentioned large-diameter portion of the piston 102 is an annular groove 116 the right end of which is closed by an annular stop member 117 which is securely fixed to the right end of the piston 102. A collar 19 of clamp claw 118 which is divided into four segments in the circumferential direction as shown in FIG. 6 is loosely fitted in the thus formed groove 116. The clamp claws 118 are provided with a forwardly converging tapered portion 119 at the respective fore ends which are fitted in the tapered center opening 107 of the plug 106. Outward movement of the clamp claw 118 is restricted by the tapered opening 107 and the groove 116, while inward deformation thereof is restricted by the resiliency of a reinforcing ring 121 which is fitted in a groove 120 formed on the inner periphery of the clamp claw 118. Therefore, the four divided segments of the clamp claw retain a cylindrical shape as shown in FIG. 6. Further formed on the inner periphery of the clamp claw 118 is an annular groove 122 which has a seal rubber ring 123 of a short cylindrical form fitted therein.

The piston 102 has a hollow cylindrical shape and is formed with a screw portion 124 at the left end for threading thereon the aforementioned cap 108. The inner surface of the piston 102 with the groove 116 is held in sliding contact with the outer periphery of a sleeve 126 through an O-ring 127, and a sealing rubber sheet 128 is provided on the right end face of the piston 102. The rubber sheet 128 is mounted in such a position that the fore end of the test pipe A such as pipes $P_1$ or $P_2$ of FIG. 1, which is held in the clamp claw 118 is hermetically abutted thereagainst to prevent leakage of air from the abutted fore end of the pipe. Further, the steel pipe which is inserted in the clamp claw 118 is securely gripped by the contracting action of the claw segments and the wedge action of the tapered portions 119 of the clamp claw 118. Thus, the plug 106 and clamp claw which perform this gripping action constitute the elements of the clamp mechanism. The aforementioned sleeve 126 is constantly urged toward the clamp claw 118 by the action of a compression spring 130 which is interposed between a stepped wall portion 129 on the inner periphery of the piston 102 and the rear end face of the sleeve. Provided at the center of the cap 108 is a joint portion 131 for connecting an air leak hose which supplies compressed air into the steel pipe A, and a passage 133 which communicates the joint portion 131 with the hollow space at the center of the clamp claw 118 through the space 130a in the compression spring 130 and an axial cavity 132 of the sleeve 126.

The steel pipe A to be tested is clamped in position for the leak test on the tester by the following operation of the clamp jig. In the first step, in order to displace the piston 102 to the left in the drawing, compressed air is fed to the left cylinder chamber 105a from the air feed passage 115a through the air discharge passage 114a. At this time, the valve Va which is connected to the air discharge passage 114a is held in closed position, while opening the valve Vb which is in communication with the air discharge passage 114b. Accordingly, the pressure in the left cylinder chamber 105a is increased, displacing the piston 102 to the left. The air in the right cylinder chamber 105b is discharged through the air discharge passage 114b and valve Vb which is in communication with the air discharge passage 114b. By this leftward displacement of the piston 102, the clamp claw 118 which has its collar 19 loosely fitted in the groove 116 on the piston 102 is also moved to the left, disengaging the tapered portion 119 of the clamp claw 118 from the tapered portion 119 of the plug 106, so that the clamp claw segments are opened radially outward by the resilient force of the reinforcing ring 121 on the inner periphery thereof to expand the inside diameter of the clamp claw 118 (although opening action beyond a certain extent is restricted by the groove 116). The inside diameter of the rubber ring 123 is also increased upon opening the clamp claw to receive a steel pipe A in the clamp claw as shown particularly in FIG. 4. The fore end of the inserted steel pipe A is abutted against the surface of the rubber sheet 128 and, as the steel pipe A is further pushed in, the compression spring 130 is contracted, moving the sleeve 126 to the left in the drawing. As soon as the steel pipe A is fully inserted in the clamp claw 118, the supply of compressed air from the air feed passage is stopped and the valve Va is opened. Further, the valve Va is closed and compressed air is supplied to the right cylinder chamber 105b through the air discharge passage 114b to displace the piston 102 to the right. By this displacement of the piston 102, the clamp claw 118 is also moved to the right to fit the tapered portion 119 into the tapered portion 107 of the plug 106 in a wedge-like fashion, fastening and contracting the inside diameter of the clamp claw 118 by wedging action to grip the steel pipe A in the clamp claw 118 through the rubber ring 123. The rubber sheet 128 is pressed against the fore end of the clamped steel pipe A by the action of the compression spring 130, so that there is no possibility of air leakage from the fore end of the steel pipe.

Upon fixing the steel pipe A in the clamp jig by the above-described operation, compressed air is supplied to the steel pipe A from the air leak hose which is connected to the joint portion 131, through the bore 133, spring chamber 130a and hollow space 132. As soon as the pressure in the steel pipe A reaches a predetermined level, a valve which is provided in the leak air hose is closed, followed by detection of fluctuations of the air pressure in the steel pipe A to check for leaking defects in the pipe. Needless to say, it is also necessary to seal the opposite end of the steel pipe A at this time. For this purpose, there may be employed a similar clamp jig which is provided with a blind plug without the air supply port 131. Inadvertent leakage of compressed air from the steel pipe can be prevented completely by the O-ring 135 between the piston 102 and cap 108, the O-ring 127 between the piston 102 and sleeve 126, and the rubber sheet 128.

Figure 7:
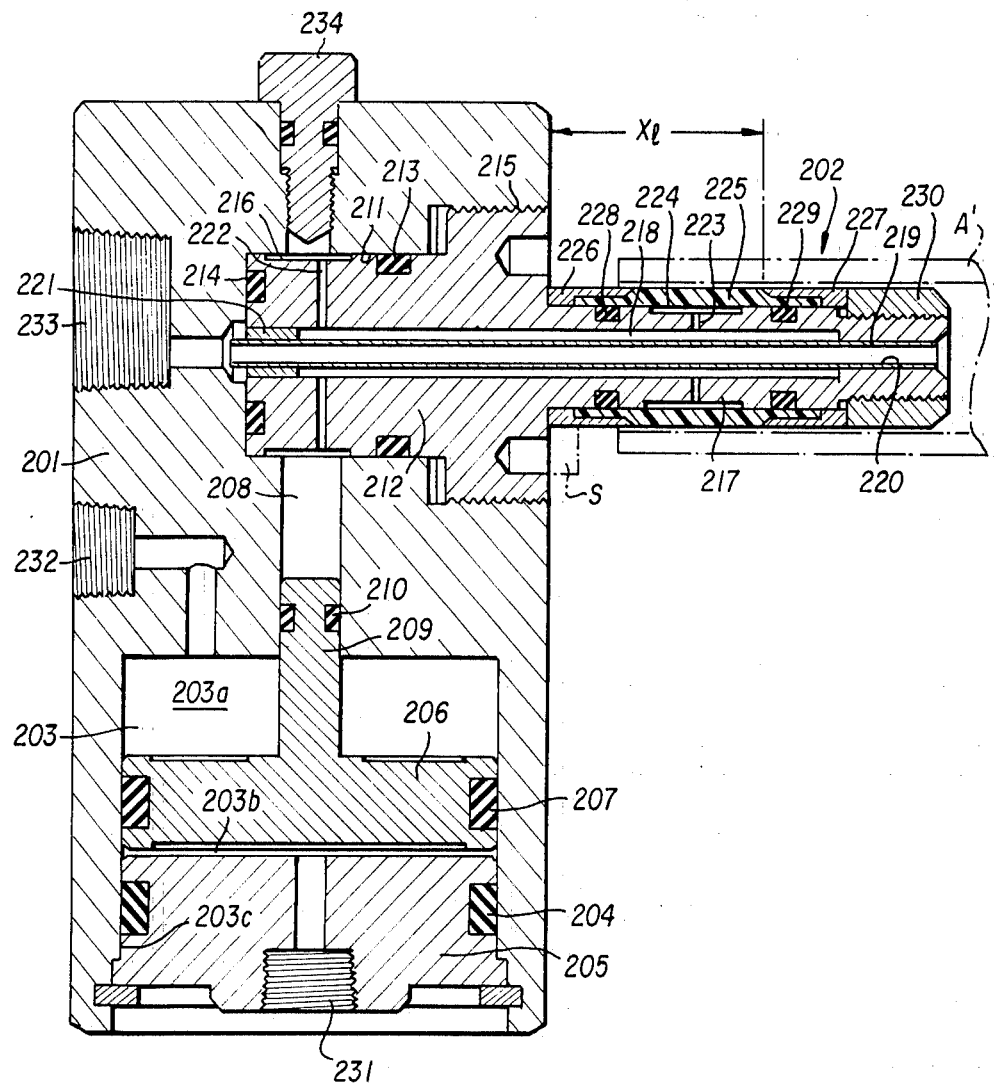
FIGS. 7 and 8 are vertical section side views of an internal clamp jig according to the present invention.
Figure 8:
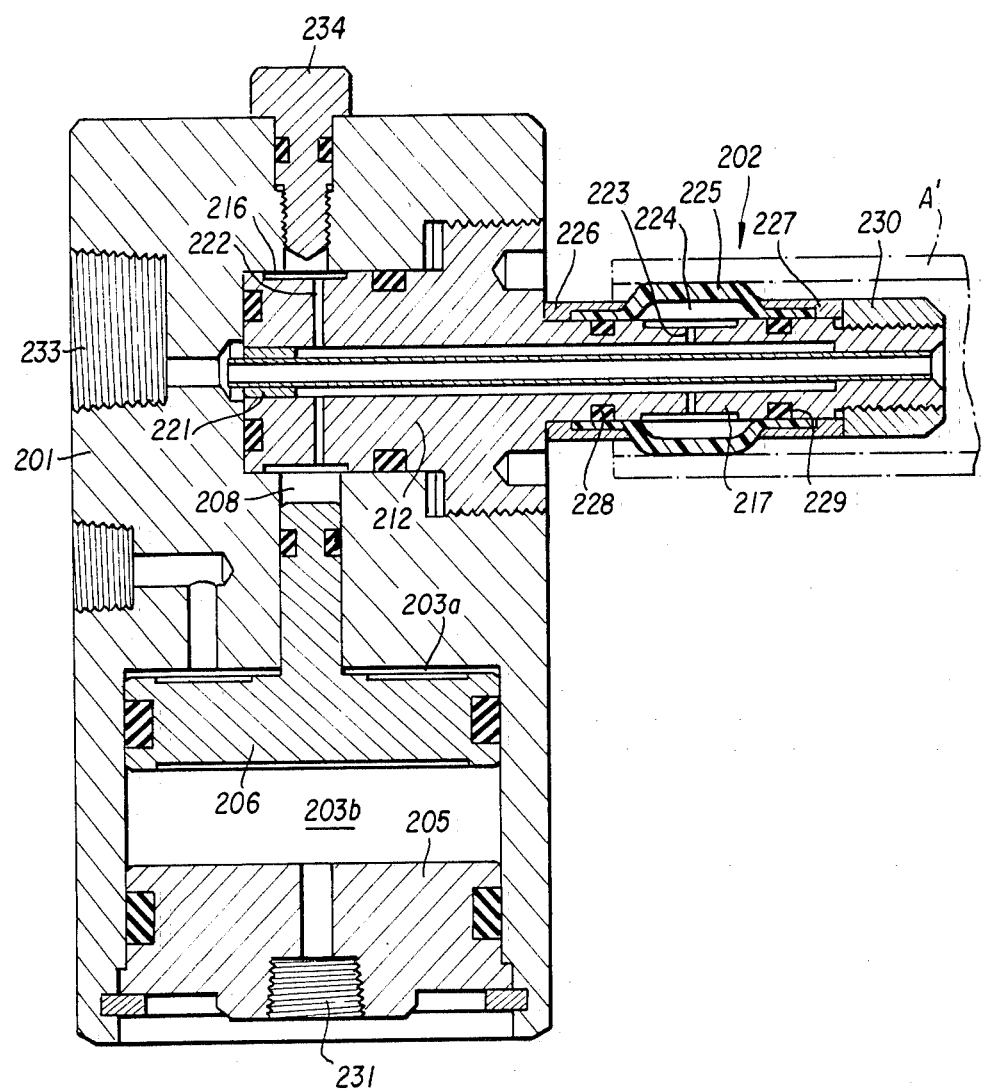

Referring now to FIGS. 7 and 8, there is shown an clamp jig also suitable for a pipe chuck the pipe leak tester according to the present invention, which can clamp a pipe to be examined by engagement with the inner periphery of the pipe no matter whether the pipe is in free state or in a fixedly installed state. In these figures, indicated at 201 is a clamp body proper with a sidewardly projected nose portion 202. Provided in the lower portion of the clamp body 201 is a hollow air cylinder chamber 203 which has an opening 203c at its bottom end hermetically closed by a lid member 205 through an O-ring 204. A piston 206 which is fitted in the air cylinder 203 through an O-ring 207 is slidable along the inner wall surface of the cylinder 203.

An oil cylinder chamber 208 is formed at the center of the clamp body 201 coaxially and in communication with the air cylinder chamber 203, and a hydraulic piston 209 which is formed coaxially and integrally on top of the piston 206 is slidably fitted in the oil cylinder chamber 208 through an O-ring 210.

Further, a boss portion 212 of the nose 202 is fitted through O-rings 213 and 214 in a nose mounting hole 211 which is bored into the clamp body 201 perpendicularly to the axis of the oil cylinder chamber 208. The boss portion 212 which is fixed in position by threaded engagement with a screw portion 215 at the outer end of the nose mounting hole 211 is provided with an annular groove 216 around the entire surface of its outer periphery which is disposed perpendicularly to the oil cylinder chamber 208. The boss portion 212 is integrally provided with a shaft portion 217 which is projected into the nose portion 202. The nose portion 202 is further provided with an oil passage 218 which is formed axially through the boss portion 212 and shaft portion 217, and has an air feed pipe 219 of a smaller diameter inserted coaxially in the oil passage 218. The fore end of the oil passage 218 is sealed pressure-tight by fitting engagement with a small-diameter portion at the fore end of the shaft portion 217, while its rear end is sealed by a seal ring 221, which is pressed between the rear ends of the air feed pipe 219 and the oil passage 218, and communicated with the groove 216 and the oil cylinder chamber 218 through an oil hole 222 which is bored through the boss portion 212 in communcation with the annular groove 216.

The shaft portion 217 is provided with an annular groove 224 on the outer periphery thereof, groove 224 being communicated with the oil passage 218 through a radial oil hole 223 and covered with a resilient sleeve 225 of synthetic rubber like polyurethane rubber or other resilient material which fitted around the outer periphery of the shaft portion 217. The opposite ends of the resilient sleeve 225 are fixedly gripped between mounting cylinders 226 and 227 which are fitted on the outer periphery of the shaft portion 217 and O-rings 228 and 229 which are fitted in grooves on the outer periphery of the shaft portion 217, respectively. The axial movements of the mounting sleeves 226 and 227 and resilient sleeve 225 are restricted by a nut 230 which is threaded at the fore end of the shaft portion 217.

As described hereinbefore, the air cylinder chamber 203 is divided into an upper air cylinder chamber 203a and a lower air cylinder chamber 203b by the piston 206. The lower air cylinder chamber 20 3b is communicated with an air port 231 in the lid 205, while the upper air cylinder chamber 203a is communicated with an air port 232 provided in the clamp body proper 201. The air feed pipe 219 is communicated with an air discharge port 233 which is provided in the clamp body 201. The upper end of the oil cylinder chamber is hermetically sealed by an air purge plug 234 which is fitted in an upper portion of the clamp body 201.

The internal clamp jig of the above-described construction operates in the following manner to clamp a steel pipe in position for the leak test. The nose portion 202 is inserted into the pipe to check for leak defects, and its nut 230, mounting sleeves 226 and 227 and resilient sleeeve 225 in a contracted state have the same outside diameter which is slightly smaller than the inside diameter of the steel pipe. Therefore, in an initial stage prior to actuation of the piston 206, in which the resilient sleeve 225 is contracted as shown in FIG. 7, the nose portion 202 can be easily inserted into the steel pipe A'. As soon as the nose portion 202 is completely inserted into the steel pipe A' as shown in FIG. 8, compressed air is fed to the air port 231 to elevate the pressure in the lower air cylinder chamber 203b, displacing the piston 206 upward. As a result, the hydraulic piston 209 which is formed integrally with the piston 206 is also displaced upward to increase the pressure of operating fluid in the oil cylinder chamber 208 and in the groove 224 which is in communication with the oil cylinder chamber 208 through the groove 216, oil hole 222, oil passage 218 and oil hole 223, thereby expanding the resilient sleeve 225 into pressed contact with the inner periphery of the steel pipe A'. In this manner, the clearance between the nose portion 202 and the inner periphery of the steel pipe is completely sealed. In this state, compressed air is fed into the steel pipe A' through the air feed pipe 219 to check for leak defects in the steel pipe A'. In the foregoing operation, the pressure in the groove 224 which is covered with the resilient sleeve 225 should be increased after the steel pipe has been fitted on the outer periphery of the resilient sleeve 225 since expansion of the resilient sleeve 225 is restricted only by the steel pipe. Therefore, it is desirable to provide a safety means, for example, a detector S like a limit switch at the root end of the nose portion 202 for the detection of insertion of the steel pipe, starting the supply of compressed air to the airport 231 by opening a valve (not shown), only when the insertion of the steel pipe is confirmed by the detector S. In order to remove the steel pipe A' from the nose portion 202 after the leak test, the air feed port 233 is opened to discharge compressed air in the steel pipe A', and then the airport 231 is opened and compressed air is sent in through the air port 232 to lower the piston 206, returning the operating fluid in the groove 224 to the oil cylinder chamber 208 to contact the resilient sleeve 225 and release the seel pipe A' from the nose portion 202. For sealing the opposite end of the steel pipe A' during the leak test, there may be employed a similar internal clamp jig which has the air feed 33 closed by a blind plug.

Although the invention has been described in terms of specific embodiments, it is to be understood that other forms of the invention may be readily adapted within the scope of the invention as defined in the appended claims.

What is claimed is:

1. A pipe leak detector for detecting leak defects simultaneously in a pair of pipes comprising:
   a pipe clamp jig for holding said pair of pipes comprising;
      a clamp body internally provided with a cylindrical chamber;
      a piston slidably fitted in said cylindrical chamber;
      a clamping means for gripping said pipes upon said pipes insertion into said clamping means and upon the displacement of said piston;
      sealing means for hermetically engaged with a fore end of each of said inserted pipes for sealing said inserted pipes;
      an air leak hose joint receptacle formed in said clamping means at one end of said cylindrical chamber for providing an air passage for communicating with said inserted pipe;
   means for supplying compressed air;
   a first on-off valve coupled to said first pipe to be examined;
   a first electromagnetic valve coupled to said first on-off valve for operating said on-off valve;
   a first circuit conduit connected to said first pipe being examined through said first on-off valve;
   a second on-off valve coupled to said second pipe to be examined;

a second electromagnetic valve coupled to said second on-off valve for operating said second on-off valve;

a second electromagnetic conduit connected to said second pipe being examined through said second on-off valve;

a main conduit for connecting said first and second circuit conduit to said means for supplying compressed air;

a third circuit conduit for coupling said first and second circuit conduits with each other;

a calibration conduit coupled to either of said first and second circuit conduits and branched therefrom;

a third on-off valve coupled to said calibration conduit;

a reference pipe coupled through said third on-off valve to said calibration conduit;

a third electromagnetic valve inserted in said third circuit conduit;

a pressure transducer connected in parallel with said third electromagnetic valve and for generating output signals;

detector means for producing a leak signal when said outputted signal from said pressure transducer exceeds a predetermined valve; and means for sealing the compressed air from said means for supplying compressed air to the pipes under examination by way of said pipe clamp jig or to the conduit connected to said reference pipe in response to the opening and closing of said first, second and third electromagnetic valves.

* * * * *